US008375977B2

(12) United States Patent
Jones

(10) Patent No.: US 8,375,977 B2

(45) Date of Patent: Feb. 19, 2013

(54) BALL VALVE WITH SINGLE ACCESS PORT

(75) Inventor: Andrew Scott Jones, Trophy Club, TX (US)

(73) Assignee: A.S. Jones & Company Inc., Trophy Club, TX (US)

( * ) Notice: Subject to any disclaimer, the term of this patent is extended or adjusted under 35 U.S.C. 154(b) by 110 days.

(21) Appl. No.: 13/082,335

(22) Filed: Apr. 7, 2011

(65) Prior Publication Data

US 2011/0260090 A1 Oct. 27, 2011

Related U.S. Application Data

(60) Provisional application No. 61/326,742, filed on Apr. 22, 2010.

(51) Int. Cl.
*F16K 5/06* (2006.01)

(52) U.S. Cl. .................. 137/240; 137/237; 251/315.05; 251/315.16

(58) Field of Classification Search ............. 251/315.05, 251/515.16, 315.1, 315.16; 137/237, 238, 137/240
See application file for complete search history.

(56) References Cited

U.S. PATENT DOCUMENTS 5,181,539 A * 1/1993 Yokoyama .................... 137/238
6,832,621 B1 * 12/2004 Williams ...................... 137/239
7,089,960 B2 * 8/2006 Maruta .................... 137/625.22

* cited by examiner

*Primary Examiner* — Kevin Lee

(74) *Attorney, Agent, or Firm* — James E. Walton; Richard G. Eldredge

(57) ABSTRACT

A ball valve with single access port includes a ball valve body; a ball disposed inside the ball valve body, the ball having an open inside portion creating a primary passage, an operating position of the ball determining the flow of fluid and pressurized cleaning agent through the valve; a secondary passage configured to allow the flow of the pressurized cleaning agent into the open inside portion of the ball and an access port allowing an external source of the pressurized cleaning agent to be coupled to the ball valve.

7 Claims, 2 Drawing Sheets

22
10
2
12
14
2
13
16

BALL VALVE WITH SINGLE ACCESS PORT

CROSS-REFERENCE TO RELATED APPLICATION

The present application claims the benefit of U.S. Provisional Application No. 61/326,742, filed Apr. 22 2010, which is incorporated herein by reference.

BACKGROUND OF THE INVENTION

The present invention generally relates to a ball valve and, more particularly, to a ball valve with a single access port for clearing drain lines.

Drain lines may get blocked during regular use. When a drain line is blocked, it can be cleared by attaching a pressurized cleaning agent or other gas source and forcing cleaning agent or other gas through one side of the drain valve and then the other to clear the blockage in each direction. Some presently available valves include two access ports to clear both sides of the valve.

The current device/system does work, but it is complicated, and it takes time to attach the pressurized cleaning agent to each of the two ports for unplugging the drain. The current device/system is large, difficult to install in limited space and is expensive to manufacture. Furthermore it does not clear a blockage from the center of the ball.

As can be seen, there may be a need for a device that allows unplugging drain lines and drain valves with a single connection to a pressurized cleaning agent source.

SUMMARY OF THE INVENTION

In one aspect of the present invention, a ball valve with single access port comprises a ball valve body, a ball disposed inside the ball valve body, the ball having an open inside portion creating a primary passage, an operating position of the ball determining the flow of fluid and pressurized cleaning agent through the valve, a secondary passage configured to allow the flow of the pressurized cleaning agent into the open inside portion of the ball and an access port allowing an external source of the pressurized cleaning agent to be coupled to the ball valve.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an exemplary embodiment of the present invention provides a ball valve with single pneumatic access port for clearing drain lines. When a drain line or drain valve is blocked, it may be cleared by attaching a pressurized cleaning agent, for example, water, air or other gas source to a ball valve and forcing cleaning agent through the center of the ball portion of the ball valve. By turning a ball valve handle may force pressurized cleaning agent through one side of a ball valve and then through the other side. The pressurized cleaning agent may clear blockages from both directions the valve, including a flow channel inside of the ball valve itself.

A standard ball valve, may be modified to allow connection of an access port fitting (typically including a Schrader® valve, a pneumatic tire valve), permitting pressurized cleaning agent to flow into the interior portion of the ball valve.

Figure 1:
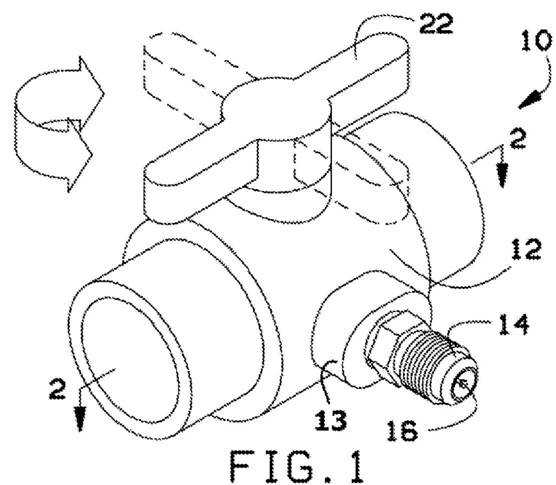
FIG. 1, is a perspective view of a ball valve with single access port according to an embodiment of the present invention.
Figure 2:
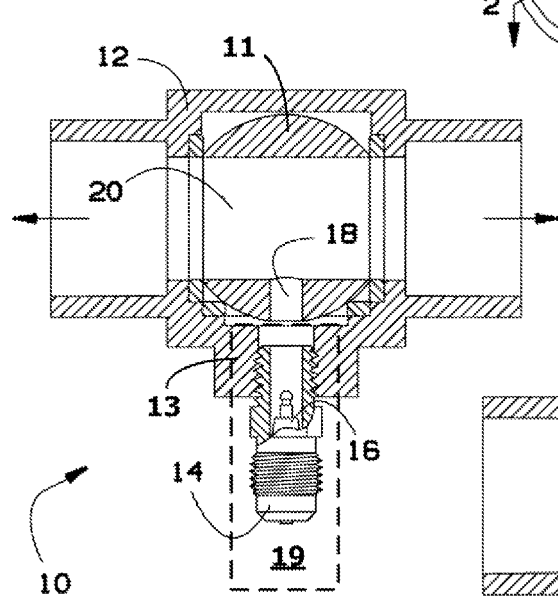
FIG. 2, is a section view of the ball valve with single access port taken along line 2-2 in FIG. 1 with the valve in the first position.
Figure 3:
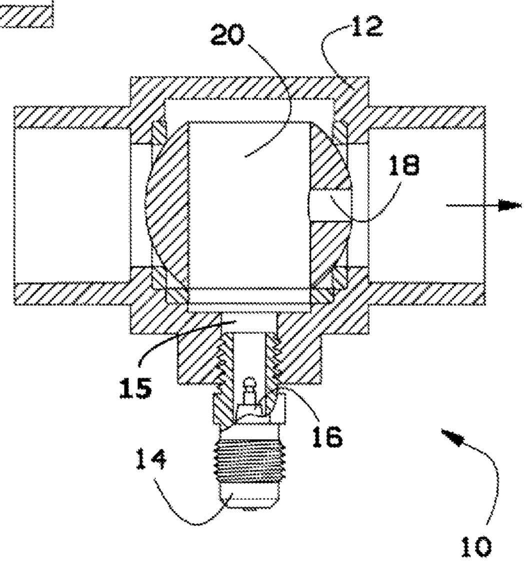
FIG. 3, is a section view of the ball valve with single access port taken along line 2-2 in FIG. 1 with the valve in the second position.
Figure 4:
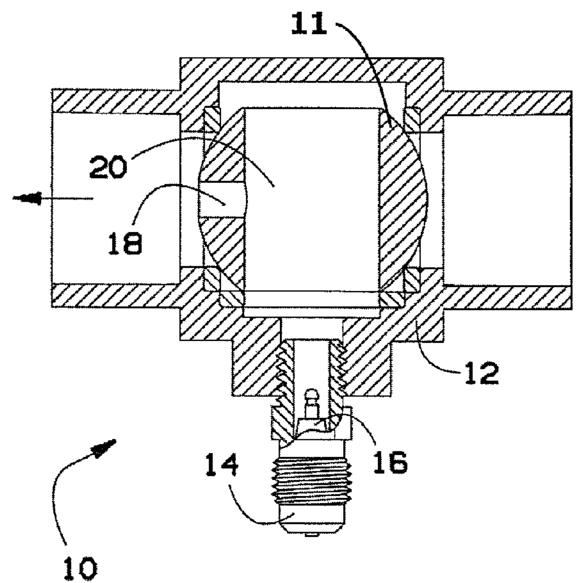
FIG. 4, is a section view of the ball valve with single access port taken along line 2-2 in FIG. 1 with the valve in the third position.
Figure 5:
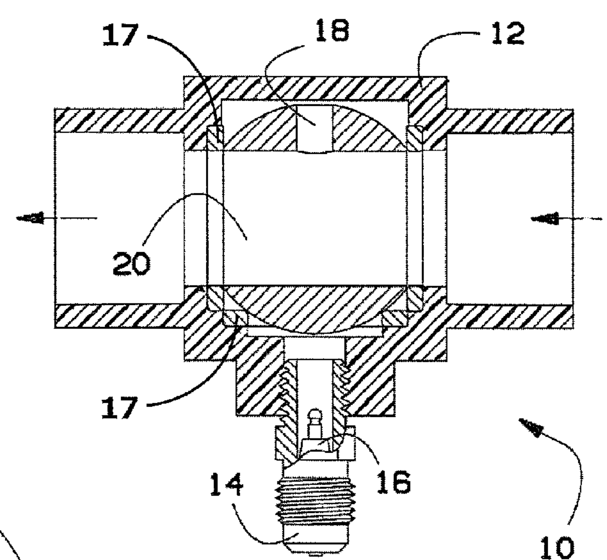
FIG. 5, is a section view of the ball valve with single access port taken along line 2-2 in FIG. 1 with the valve in the fourth position.

Referring now to FIGS. 1-5, different views of a ball valve with single access port 10 are shown according to exemplary embodiments of the present invention. It should be noted; for sake of brevity the ball valve with single access port is referred to as "valve" in the rest of this disclosure. The valve 10 may be a modified ball valve with an addition of an access port 19 and with a formation of secondary pass 18 on a side of the ball 11. Valve 10 may include a ball valve body 12, a ball 11, ball seals 17 and a handle 22. A stem and stem seal system are not shown, and may be of the type standard to the industry. The ball 11 may have an open inside portion forming a primary passage 20. The access port 19 may include a built up area 13 with a threaded through hole 15. The built up area 13 may be formed on one side the ball valve body 12. The threaded through hole 15 may be configured to accept an intake valve via a threaded fitting, for example, a pneumatic tire valve 16 via a pneumatic tire valve fitting 14. The pneumatic tire valve 16 and pneumatic tire valve fitting 14 may be at a 90 degree angle relative to the flow of fluid when the valve 10 is in a first position ("open" position). The pneumatic tire valve 16 may allow a pressurized cleaning agent source to be coupled to the valve 10 from an outside source. The secondary passage 18 may be created by forming a hole through the center of the side of the ball 11 penetrating into the open inside portion of the ball 11 in a way that when the ball is in the first position as illustrated in FIG. 2 the secondary passage 18 may be lined up with the access port 19. The handle 22 may be coupled to ball 11 via the stem. Turning the handle 22 may rotate the ball 11 and may move the ball 11 to one of four operational positions. Each of the operational positions may have a unique fluid and pressurized cleaning agent flow pattern associated with. When the handle 22 is aligned parallel to the body of the valve 12, as shown in FIGS. 1, 2 and 5, the valve 10 may be in a first and a fourth position respectively allowing fluid flow. Turning the handle 22 from the first position by 90 degree angle counter clockwise into a second position may isolate the left side from the right side of the valve 10 and may open the right side of valve 10 for clearing as shown in FIG. 3. Turning the handle 22 by 90 degree angle clockwise from the first position to a third position may isolate the left side from the right side of the valve 10 and may open the left side of the valve 10 for clearing as shown in FIG. 4.

Figure 6:
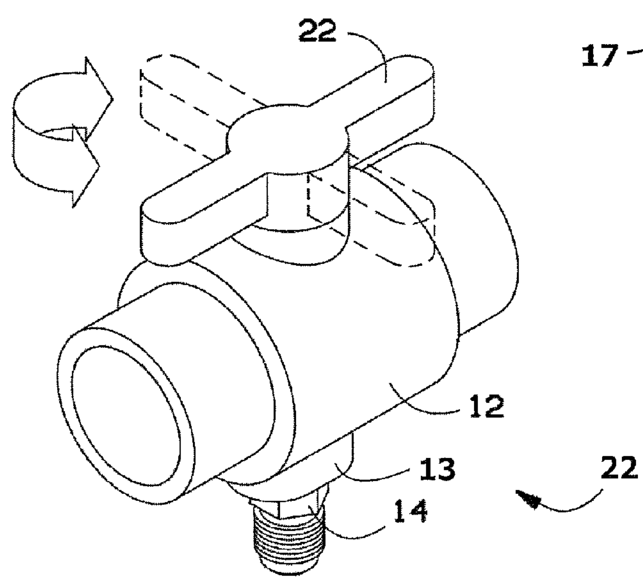
FIG. 6, is a perspective view of a ball valve with single access port according to another embodiment of the present invention.

Referring now to FIG. 6, a valve 22 is shown according to another exemplary embodiment of the present invention. The valve 22 is a modified implementation of the valve 10. The valve 22 may share most of the features of the valve 10 with two exceptions. The access port 19 may be formed on the bottom instead of the side of the ball valve body 12. A second hole (not shown) may be formed on the bottom of the ball 11 for providing an inlet for the pressurized cleaning agent into the open inside portion of the ball 11, or the drain valve may be of a design where the physical limitation of water flow in the normal "closed" position is not an actual sphere, but an inverted hemisphere or some other form.

The described valves 10 and 22 may be manufactured from polyvinyl chloride (PVC) or other suitable plastic materials and may be made to all standard sizes of the art.

These valves 10 and 22 may be used on most any commercial or residential drain line, including, but not limited to plumbing and heating, ventilating, and air conditioning (HVAC) drains.

It should be understood, of course, that the foregoing relates to exemplary embodiments of the invention and that modifications may be made without departing from the spirit and scope of the invention as set forth in the following claims.

What is claimed is:

1. A ball valve with single access port, comprising:

a ball valve body;

a ball, the ball disposed inside the ball valve body, the ball having an open inside portion creating a primary passage, an operating position of the ball determining the flow of fluid and pressurized cleaning agent through the valve;

a secondary passage configured to allow the flow of pressurized cleaning agent into the open inside portion of the ball; and an access port comprising:

a built up area formed on one side of the ball valve body;

a threaded through hole formed in the center of the built up area, the threaded through hole penetrating through the ball valve body;

a threaded fitting configured to fit into the threaded through hole; and an intake valve disposed inside the threaded fitting, the intake valve being configured to provide unidirectional flow of the pressurized cleaning agent into the ball valve, the access port allowing an external source of the pressurized cleaning agent to be coupled to the ball valve.

2. The ball valve with single access port of claim 1, wherein the secondary passage created by forming a hole through the center of one side of the ball penetrates into the open inside portion of the ball.

3. The ball valve with single access port of claim 1, wherein the intake valve is a pneumatic tire valve.

4. The ball valve with single access port of claim 1, wherein the threaded through hole is perpendicular to a longitudinal axis of the ball valve body.

5. The ball valve with single access port of claim 1, wherein the ball has four operating positions;

in a first and a fourth operating positions the fluid flow being allowed;

in a second operating position a left side of the valve being isolated from a right side of the valve, and the right side of valve is open for clearing; and in a third operating position the left side of the valve being isolated from the right side of the valve, and the left side of valve is open for clearing.

6. The ball valve with single access port of claim 1, further includes a handle, the handle coupled to the ball, the handle adapted for changing the operating positions of the ball.

7. The ball valve with single access port of claim 1, wherein the ball valve body is made of polyvinyl chloride.

* * * * *